US011297218B1

(12) United States Patent
Nadeau et al.

(10) Patent No.: US 11,297,218 B1
(45) Date of Patent: Apr. 5, 2022

(54) SYSTEM AND METHOD FOR DISPATCHING MEDIA STREAMS FOR VIEWING AND FOR VIDEO ARCHIVING

(71) Applicant: GENETEC INC., St-Laurent (CA)

(72) Inventors: Sebastien Nadeau, Sainte-Thérèse (CA); Simon Le Bourdais-Cabana, Dollard-des-Ormeaux (CA)

( * ) Notice: Subject to any disclaimer, the term of this patent is extended or adjusted under 35 U.S.C. 154(b) by 74 days.

(21) Appl. No.: 16/664,564

(22) Filed: Oct. 25, 2019

(51) Int. Cl.
*H04N 5/232* (2006.01)
*G08B 25/10* (2006.01)
*H04L 65/65* (2022.01)
*H04N 21/218* (2011.01)

(52) U.S. Cl.
CPC ......... *H04N 5/23206* (2013.01); *G08B 25/10* (2013.01); *H04L 65/608* (2013.01); *H04N 5/23222* (2013.01); *H04N 21/2181* (2013.01)

(58) Field of Classification Search
CPC ........... H04N 5/23206; H04N 5/23222; H04N 21/2181; G08B 25/10; H04L 65/608
See application file for complete search history.

(56) References Cited

U.S. PATENT DOCUMENTS

| | | | | |
|---|---|---|---|---|
| 6,108,728 A * | 8/2000 | Kobayashi | ........... | H04N 21/218 348/E5.008 |
| 6,115,740 A * | 9/2000 | Mizutani | ............ | H04N 7/17336 348/E7.073 |
| 6,424,370 B1 * | 7/2002 | Courtney | ........... | G06K 9/00342 348/143 |
| 6,535,238 B1 * | 3/2003 | Kressin | ................... | H04N 7/141 348/14.01 |
| 8,645,549 B2 * | 2/2014 | Arima | ............... | H04L 29/12783 709/227 |
| 8,773,532 B2 | 7/2014 | Wengrovitz et al. | | |
| 8,904,457 B2 * | 12/2014 | Sood | ................ | H04N 21/26283 725/92 |
| 9,172,918 B2 * | 10/2015 | Palmer | .................... | H04N 7/181 |
| 9,338,483 B2 * | 5/2016 | Itakura | ............... | H04N 5/23203 |
| 9,986,209 B2 | 5/2018 | Meyer | | |
| 10,911,816 B2 * | 2/2021 | Sakai | ...................... | H04N 7/183 |
| 2006/0204229 A1 * | 9/2006 | Onodera | ................ | H04N 7/181 386/223 |
| 2007/0130597 A1 * | 6/2007 | Parker | ................. | H04L 65/4076 725/94 |

(Continued)

FOREIGN PATENT DOCUMENTS

| | | | | | |
|---|---|---|---|---|---|
| EP | 2148333 A2 * | 1/2010 | ......... | H04N 21/4223 |
| EP | 3599607 A1 * | 1/2020 | ......... | G11B 27/3081 |

(Continued)

*Primary Examiner* — James R Sheleheda
(74) *Attorney, Agent, or Firm* — Anglehart et al.

(57) ABSTRACT

A method of managing at least one media stream received from respectively at least one camera; it includes instructing a camera to send a media stream generated by the camera to an archiver, the archiver being configured to store video data from the media stream; receiving a request for real time access to the media stream from a requesting computing entity; and sending a first change of destination message to the camera comprising instructions to change the destination to a dispatcher configured to receive and dispatch stream data, such that the camera continues transmission of the media stream sending the media stream towards the dispatcher.

21 Claims, 8 Drawing Sheets

(56) References Cited

U.S. PATENT DOCUMENTS

| | | | |
|---|---|---|---|
| 2008/0281951 A1* | 11/2008 | Branam | H04L 65/607 709/223 |
| 2009/0031381 A1* | 1/2009 | Cohen | H04L 29/08846 725/115 |
| 2009/0046211 A1* | 2/2009 | Maekawa | H04N 5/77 348/739 |
| 2009/0049491 A1* | 2/2009 | Karonen | H04L 67/104 725/105 |
| 2010/0003008 A1* | 1/2010 | Thomas | H04N 21/6587 386/344 |
| 2011/0169952 A1* | 7/2011 | Yamaguchi | H04N 19/164 348/143 |
| 2011/0264811 A1* | 10/2011 | Arima | H04L 29/12783 709/227 |
| 2012/0060053 A1* | 3/2012 | White | G06F 11/2025 714/6.3 |
| 2012/0278855 A1* | 11/2012 | Ando | H04L 63/162 726/3 |
| 2012/0314018 A1* | 12/2012 | Wengrovitz | G08B 13/19693 348/14.08 |
| 2013/0336627 A1* | 12/2013 | Calvert | H04N 21/2187 386/224 |
| 2014/0010517 A1 | 1/2014 | Sheffler et al. | |
| 2014/0331103 A1* | 11/2014 | Grube | H04L 9/085 714/763 |
| 2015/0199366 A1* | 7/2015 | Marlatt | H04N 21/4335 707/823 |
| 2015/0312598 A1* | 10/2015 | Itakura | H04N 5/268 725/117 |
| 2018/0167631 A1* | 6/2018 | Schulze | H04N 21/2187 |
| 2018/0343473 A1* | 11/2018 | Jeong | H04N 21/42222 |
| 2019/0394375 A1* | 12/2019 | Barnich | H04N 5/23238 |
| 2020/0105111 A1* | 4/2020 | Messer | G06K 9/00664 |
| 2021/0029343 A1* | 1/2021 | Hamada | H04N 13/111 |

FOREIGN PATENT DOCUMENTS

| | | | |
|---|---|---|---|
| JP | 2008199677 A | * 8/2008 | |
| JP | 2010050956 A | * 3/2010 | H04L 12/2809 |
| WO | WO 2014/082294 A1 | 6/2014 | |

\* cited by examiner

SYSTEM AND METHOD FOR DISPATCHING MEDIA STREAMS FOR VIEWING AND FOR VIDEO ARCHIVING

TECHNICAL FIELD

The present disclosure relates to surveillance systems, and more particularly to archiving and dispatching systems of media streams generated by cameras of a surveillance system.

BACKGROUND

Cloud-based management services are offered for surveillance systems. Such surveillance systems may be set up, e.g., in a home or business. The media streams may be streamed to the Cloud where the media stream is archived. However, a user may request to view the media streams generated by the camera by, for instance, logging into an account from, e.g., a browser and stream footage from the camera. This can be used, for example, to implement a security desk or just to occasionally check up on a space (e.g. check up on your home to look after your pet, etc.)

As such, management services may be structured such as to store media streams and to respond to a user request to view a real-time access generated by a camera. In some examples, the video may first be stored, and the stored video retrieved by the service when a real-time access request is made. However, in this example, it takes at least a few seconds for video to be useably retrieved after being first sent to the storage media. This causes a delay.

In order to avoid delays when a live-feed request is made, the cloud-based management service may have a dispatcher that receives the media stream from the camera. The dispatcher is configured to send a media stream to both an archiver for archiving the media stream in storage media and to the user's computing device. However, the consequence of having a dispatcher that is continuously receiving the media stream is that it is far more resource-consuming, being a costlier solution as the service would have to purchase server services and/or computing power for the dispatcher at all times such as to handle the fast responsiveness in case a user requests a real-time access.

A solution would be to have the cameras stream directly to the storage media, and to provide users the ability to access stored streams directly therefrom. However, this may lead to an unacceptable delay (e.g. up to 30 seconds) in the video received by the user.

As such, a media stream archiving solution that allows a user to receive a live video feed while reducing the resource-consumption of its components would be advantageous.

SUMMARY

The present disclosure relates to a media stream archiving system that enables a user to access a live video-feed while simultaneously archiving the media stream without latency or delay. Moreover, the system reduces the resource costs associated with the dispatcher by only having the dispatcher in the streaming pipeline when a real-time access request is made by a user, resulting in the dispatcher being less solicited.

The system is configured to have the camera transmit the media stream directly to the storage media for archiving the storage media unless a live-feed request is made by a user. When a live-feed request is made, the camera is instructed to change its streaming destination from the storage media to the dispatcher. The dispatcher then seamlessly transmits the video stream to both the user's computing device and the storage media. The media stream received by the user is generated by the camera without having first been archived. The media stream sent by the dispatcher to the storage media is also being archived such as not to interrupt the archiving of the media stream. As such, the storage media is accessible by both the camera and the dispatcher.

When the user is no longer requesting the real-time access, a notice of information is further sent to the camera to transmit the media stream to the storage media, and not to the dispatcher. As such, the dispatcher is only involved when a live-feed request is made. Therefore, the dispatcher no longer needs to be constantly receiving and dispatching media data to the storage media for every stream.

A real-time access is received by the system. The system generates instructions sent to the camera to have its media stream transmitted to the dispatcher as explained herein.

A first broad aspect is a method of managing at least one media stream received from respectively at least one camera. The method includes instructing a camera to send a media stream generated by the camera to storage media, the storage media being configured to store video data from the media stream; receiving a request for real time access to the media stream from a requesting computing entity; and sending a first destination message to the camera comprising instructions to change the destination to a dispatcher configured to receive and dispatch stream data, such that the camera continues transmission of the media stream sending the media stream towards the dispatcher.

In some embodiments, the method may include receiving the media stream of the camera at the dispatcher, the dispatcher transmitting the media stream to the storage media and transmitting at least data from the media stream to the requesting computing entity, such that the storage media receives the continuous media stream through the transition of media stream destination from the storage media to the dispatcher.

In some embodiments, the first destination message may include a change of address instruction indicating an address corresponding to the dispatcher.

In some embodiments, the method may include, upon determining that the real-time access is no longer needed, sending a second change of destination message to the camera comprising instructions to change the destination of the media stream to the storage media, such that the storage media may receive a logically continuous sequence of video data from the media stream through the transition of media stream destination from the dispatcher to the storage media.

In some embodiments, the second change of destination message may include a change of address instruction indicating an address corresponding to the storage media.

In some embodiments, the method may include, upon determining that the real-time access is no longer needed, sending a message to stop media streaming to the camera comprising instructions to stop the media streaming to the dispatcher, causing the camera to transmit the media stream to the storage media such that the storage media receives a logically continuous sequence of video data from the media stream through the transition of media stream destination from the dispatcher to the storage media.

In some embodiments, the method may include sending one or more camera setting commands to the camera for causing the camera to change one or more camera settings corresponding to the one or more camera setting commands.

In some embodiments, the one or more camera setting commands may include a command to inject a new key frame.

In some embodiments, the method may include, prior to sending the first destination message, retrieving from memory camera stream identification information corresponding to the cameras associated with the real-time access request.

Another broad aspect is a system for managing at least one media stream received from respectively at least one camera. The system includes non-transitory memory to store data and instructions; a processor in communication with the memory; and an application program accessible via the memory and the processor that includes a controller module comprising program code that, when executed by the processor, causes the processor to instruct a camera to send a media stream generated by the camera to storage media, the storage media being configured to store video data from the media stream; and a dispatcher comprising program code that, when executed by the processor, causes the processor to: dispatch a media stream received from a camera to storage media and to a computing entity requesting real time access; receive a request for real time access to the media stream from a requesting computing entity; and send a first destination message to the camera comprising information to change the destination to a dispatcher of the application program configured to receive and dispatch stream data, such that the camera continues transmission of the media stream sending the media stream towards the dispatcher.

In some embodiments, the dispatcher may include program code that, when executed by the processor, causes the processor to, upon receipt at the dispatcher of the media stream of the camera, transmit the media stream to the storage media and transmit at least data from the media stream to the requesting computing entity, such that the storage media receives the continuous media stream through the transition of media stream destination from the storage media to the dispatcher.

In some embodiments, the first change of destination message may include a change of address instruction indicating an address corresponding to the dispatcher.

In some embodiments, the dispatcher may include program code that, when executed by the processor, cause the processor to, upon determining that the real-time access is no longer needed, send a second destination message to the camera comprising instructions to change the destination of the media stream to the storage media, such that the storage media receives a logically continuous sequence of video data from the media stream through the transition of media stream destination from the dispatcher to the storage media.

In some embodiments, the second change of destination message may include a change of address instruction indicating an address corresponding to the storage media.

In some embodiments, the dispatcher may include program code that, when executed by the processor, cause the processor to, upon determining that the real-time access is no longer needed, send a message to stop media streaming to the camera comprising instructions to stop the media streaming to the dispatcher, causing the camera to transmit the media stream to the storage media such that the storage media receives a logically continuous sequence of video data from the media stream through the transition of media stream destination from the dispatcher to the storage media.

In some embodiments, the dispatcher may include program code that, when executed by the processor, cause the processor to send one or more camera setting commands to the camera for causing the camera to change one or more camera settings corresponding to the one or more camera setting commands.

In some embodiments, the one or more camera setting commands may include a command for generating a new key frame.

In some embodiments, the dispatcher may include program code that, when executed by the processor, prior to sending the first destination message, cause the process to retrieve from memory camera stream identification information corresponding to the cameras associated with the real-time access request.

In some embodiments, the controller may include program code that, when executed by the processor, prior to sending the first destination message, cause the process to retrieve from memory camera stream identification information corresponding to the cameras associated with the real-time access request.

In some embodiments, the first destination message may include an RTSP request comprising camera stream identification information.

Another broad aspect is a non-transitory computer-readable medium storing instructions executable by a computer device including at least one instruction for causing the computer device to instruct a camera to send a media stream generated by the camera to storage media, the storage media being configured to store video data from the media stream; at least one instruction for causing the computer device to receive a request for real time access to the media stream from a requesting computing entity; and at least one instruction for causing the computer device to send a first change of destination message to the camera comprising instructions to change the destination to a dispatcher configured to receive and dispatch stream data, such that the camera continues transmission of the media stream sending the media stream towards the dispatcher.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to a system for archiving one or more media streams generated by a surveillance system, where the system is configured to transmit a real-time access of a media stream to a user's computer upon receiving a request from the user (e.g. from the workstation of the user; the smartphone of the user, etc.)

The system may be part of the surveillance system, or may be a system that provides an archiving and/or viewing service via the web (e.g. Cloud archiving and/or viewing service).

The system may be implemented on one or more computers.

In the present disclosure, by using the term "logically continuous" in association with a change of destination in the media stream, it is meant a media stream where little to no data is lost when the destination of the media stream is changed. However, in some examples, some (but little) data may still be lost due to the transition.

Figure 1:
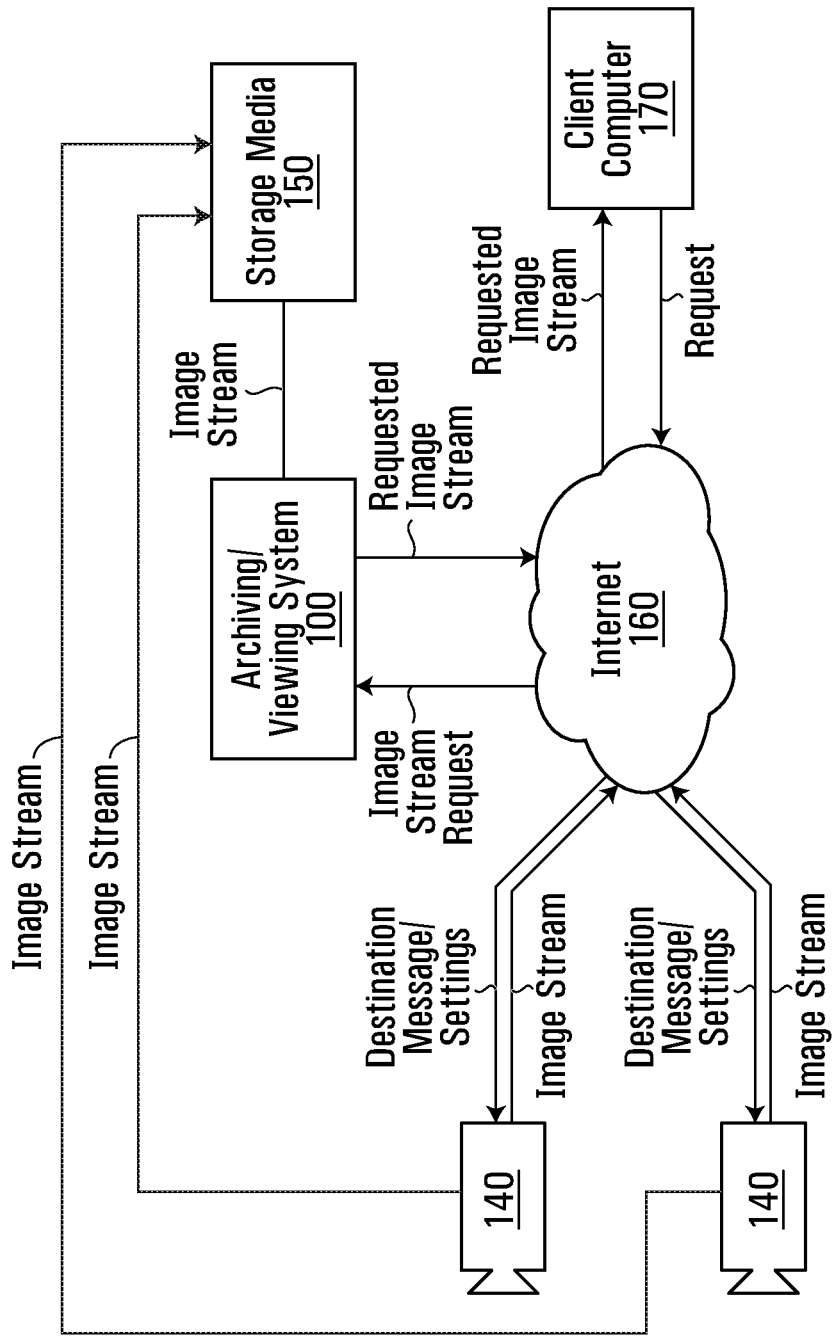
FIG. 1 is a block diagram of an exemplary surveillance system connectable to an exemplary archiving and dispatching system and to a client computer.

Surveillance Architecture:

Reference is now made to FIG. 1, illustrating an exemplary surveillance architecture, where the components (e.g. cameras 140) of the surveillance system are connected via the web 160 to one or more client computers 170 and to the exemplary archiving and dispatching system 100. The archiving and dispatching system 100 archives the media stream the system 100 receives from the camera 140 in storage media 150 (e.g. servers for media storage).

The surveillance system may be one implemented in a home, a business, etc., having one or more cameras 140 generating media streams, including video data (e.g. metadata, compressed or uncompressed video data) that can be accessed by a user of the surveillance system. For illustrative purposes, FIG. 1 shows the surveillance system as having two cameras 140. However, it will be understood that the surveillance system may have less or more than two cameras 140, or other surveillance components (e.g. radars, microphones, sensors, etc.) without departing from the present teachings.

The camera 140 may be generating a compressed media stream in accordance with a given codec. The camera 140 may be one as is known in the art for generating a media stream (e.g. PTZ camera).

The media stream generated by the camera 140 may be sent via a wired or wireless connection 160 (e.g. over the Internet or over a local network, such as a LAN network) to the archiving and dispatching system 100.

The archiving and dispatching system 100 receives the image stream and archives the media stream in storage media 150.

When an authorized user of the surveillance system requests a real-time access viewing of a media stream, the request may be sent via the web to the archiving and dispatching system 100.

As explained herein, once the archiving and dispatching system 100 receives the user request, the archiving and dispatching system 100 generates a destination message sent to the camera 140 via the web 160 such that the camera 140 transmits the media stream to the dispatcher component of the system 100 instead of to the storage media 150. The dispatcher components transmits, via the web, the received media stream to the client computer 170, and equally transmits the received media stream to the storage media 150, such that the storage of the media stream is continuous (i.e. uninterrupted).

Once the user no longer requests the real-time access, the archiving and surveillance system 100 receives input that a real-time access is no longer being viewed via the user computer. The archiving and dispatching system 100 then generates a destination message, sent via the web 160 to the camera 140 (one or more cameras 140), such that the cameras 140 change the transmission destination of the media stream from the dispatcher component of the archiving and dispatching system 100 to the storage media 150.

An Exemplary Archiving and Dispatching System 100:

Reference is now made to FIGS. 2A-2E (referred collectively as FIG. 2), illustrating different modes of the archiving and dispatching system 100.

FIG. 2 shows the software architecture of the archiving and dispatching system 100, implemented on an exemplary computer system as shown in FIG. 6.

The system 100 has a dispatcher application program 105. The dispatcher application 105 has a dispatcher module 105a and an archiver module 104. The system 100 also has a controller module 106. In some embodiments, the controller module 106 may be included as part of the dispatcher application 105.

It will be understood that the system 100 may have one or more I/O interfaces for receiving and/or transmitting data over a network as is known in the art.

The dispatcher application 105 includes program code that, when executed by a processor, causes the processor to, upon receiving a media stream from the camera 140, transmit the media stream to both the storage media and to the address (e.g. IP address) of the user computer 170 such that the user can view a live stream from the user computer 170.

The dispatcher application 105 may include a dispatcher module 105a and an archiver module 104.

The dispatcher module 105a includes program code that, when executed by a processor, causes the processor to receive a real-time access request from a user computer. The dispatcher module 105a then causes the processor to generate and transmit a destination message directed to camera 140 that causes the camera 140 to transmit the video stream to the dispatcher module 105a, and not to the storage media 150. Moreover, the dispatcher module 105a then causes the processor to detect that the user computer 170 is no longer requesting a live stream, and to send a notification to the camera 140 to end the transmission of the media stream to the dispatcher module 105a (resulting in the camera 140 transmitting the media stream back to the storage media 150).

The dispatcher module 105a may also cause the processor to transmit the media stream received by the camera 140 to the archiver module 104.

The archiver module 104 includes program code that, when executed by the processor, causes the processor to receive the media stream from the dispatcher module 105a, and redirect the media stream to the storage media 150 for remote storage, such that the storage of the media stream generated by the camera 140 is continuous, despite the camera 140 changing the destination of the media stream from the storage media 150 to the dispatcher module 105a. As such, the program code of the archiver module 104 may also allow for communication with an API of the storage media 150, such as to permit the transmission of the media stream received from the camera 140 to the storage media 150 for storage.

An exemplary archiver module 104 may be or include:
StreamSourceId=CreateStreamSource( )
StreamSourceIds=ListStreamSources( )
SetStreamSourceConfiguration(StreamSourceId,
    StreamQualityConfiguration)
GetStreamSourceConfiguration(StreamSourceId)
SetStreamTargetStorageMedia(StreamSourceId, Storage-MediaType, StorageMediaLocation, StorageCredentials)

It will also be understood that the different modules and application program of the system 100 (e.g. dispatcher application 105) may have one or more application programming interfaces (APIs) for facilitating communication by way of establishing or more interfaces and/or protocols between different software programs, computers, cameras and/or programs.

In some examples, the controller module 106 may also include an archiver module function which may be, for instance:
CameraSourceId=CreateCameraSource( )
StreamSourceId=CreateStreamSource( )
StreamSourceIds=ListStreamSources( )
SetStreamSourceConfiguration(StreamSourceId,
    StreamQualityConfiguration)
GetStreamSourceConfiguration(StreamSourceId)
SetStreamTargetStorageMedia(StreamSourceId, Storage-MediaType, StorageMediaLocation, StorageCredentials)

In some embodiments, the configurations may then be sent by the controller module 106 to the archiver module 142 of the camera 140 and the archiver module 104 of the system 100. In some embodiments, the dispatcher module 105 can query the controller module 106 for generating an RTSP (real time stream protocol) destination message (e.g. RTSP live request) that includes the identification of the stream(s) (i.e. StreamSourceId) associated with the camera 140. In this example, the archiver module 142 of the camera 140 may recognize the stream identification that is part of the destination message (e.g. RTSP live request), and can allow a new RTSP session to take over between the dispatcher module 105 and the archiver module 142 of the camera 140, thereby ending the transmission of the stream by the camera 140 to the storage media 150.

In some examples, the dispatcher module 105a may further include program code that, when executed by a processor, causes the processor to detect the compression format of the video data of the media stream, may decompress the compressed video data of the media stream, and recompresses the decompressed video data of the media stream in a different compression format for storage.

The dispatcher module 105a may further cause the processor to detect data indicating that the user that has made the real-time access request is no longer using the real-time access. The dispatcher module 105a causes the verification of the received data to end the real-time access, verifies that the received data corresponds to the same client that made the request to view the real-time access. In this case, the dispatcher module 105a causes the processor to retrieve from memory the location and/or identity of the one or more cameras 140, or stream identifications, that are currently transmitting the media stream to the dispatcher module. In some embodiments, the dispatcher module 105a may request that the controller module 106 retrieve stream identification information from memory.

The controller module 106 includes program code that, when executed by a processor, causes the processor to begin the streaming by a camera 140 of a surveillance system to the storage media 150. As such, the controller module 106 causes the processor to receive a streaming request from a remote computer 180 that is used to administer, e.g., a surveillance system with one or more cameras 140. Upon receipt of the streaming request, the controller module 106 causes the processor to generate a destination message to the camera 140, causing the camera 140 to transmit an image stream to remote storage 150. The controller module 106 also causes the processor to store in memory identification information pertaining to the one or more cameras 140 that are streaming to the storage media 150 following a request generated by the controller module 106.

The controller module 106 may also cause the processor to, upon receiving a request from the dispatcher module 105 retrieve camera identification information associated with a real-time access request, to verify the addresses of the cameras associated with the user's system that generated the request (e.g. by verifying surveillance system information stored in memory), and retrieve from memory the camera identification information associated with the real-time access request. The controller module 106 then causes the processor to transmit the camera identification information to the dispatcher module 105a.

It will be understood that the archiving and dispatching system 100 may be in communication with one or more different surveillance systems, each associated, for instance, with a different client.

The camera 140 may be a camera as is known in the art. In the exemplary camera 140 shown in FIG. 2, the camera 140 includes in its program code a DSRM archiver module 142, a device RTSP protocol 143, and a device native control protocol 144 as is known in the art.

The DSRM archiver module 142 includes program code that, when executed by the processor of the camera 140, causes the processor to transmit a media stream generated by the camera 140 to a given destination (e.g. storage media 150, dispatcher module 105a), in accordance with the device RTSP protocol 143.

The RTSP protocol 143 of the camera 140 includes program code that, when executed by the processor of the camera 140, causes the processor to establish and control media sessions between endpoints, as a function of remote commands received by the camera 140 from, e.g., the camera controller 106 or the dispatcher module 105a.

For instance, the RTSP protocol 143 may receive the destination messages from the controller module 106 and/or the dispatcher module 105a, and cause the DSRM archiver module 142 to transmit the media stream to a destination in accordance with the received destination message.

The device native control protocol 144 includes program that, when executed by the processor of the camera 140, causes the processor to run and control the functioning of the camera, as is known in the art.

Figure 2A:
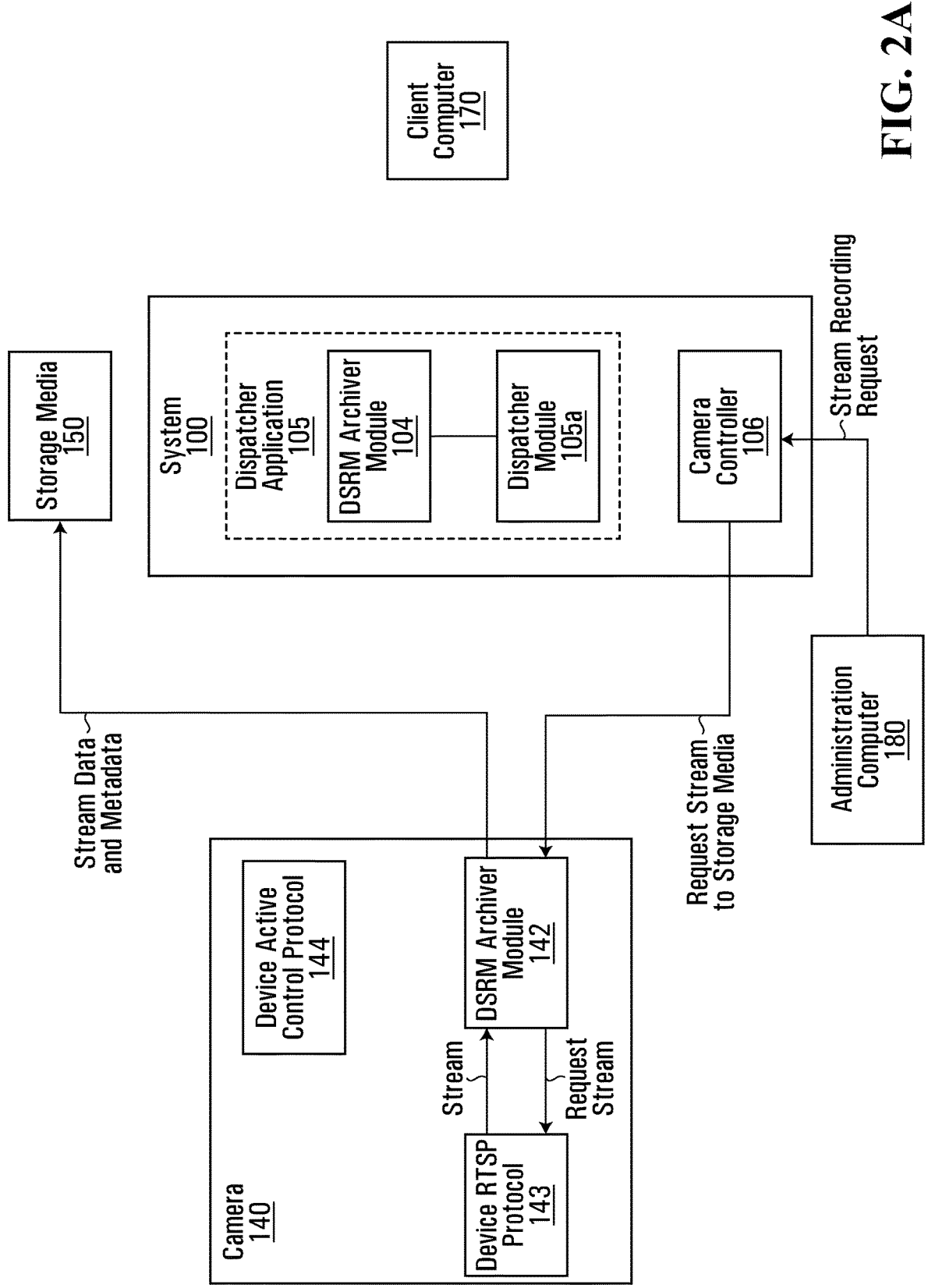
FIG. 2A is a block diagram of a first mode of an exemplary archiving and dispatching system when the system has not received a real-time access request.

In FIG. 2A, an administration computer 180 transmits a stream recording request to the controller module 106 for causing a camera 140 to start transmitting its media stream to local or remote (e.g. Cloud-based) storage media 150 for archiving.

In some examples, a SSH tunnel with remote port forwarding may be established between the camera 140 (e.g. the DSRM archiving module 142 of the camera 140) and the camera controller 106.

The camera controller 106 includes program code that, when executed by the processor, causes the processor to receive the stream recording request from the administration computer 180, and generates a request to stream to the destination of the storage media. The camera controllers 106 causes the transmission of the request to the DSRM archiving module 142 of the camera 140.

The DSRM archiving module 142, upon receipt of the stream request, transmits the stream request to the RTSP protocol 143. In accordance with the RTSP protocol 143, the media stream generated by the camera 140 is received by the DSRM archiving module 142. The DSRM archiving module 142 in turn causes the transmission of the media stream generated by the camera 140 to the storage media 150, where the DSRM archiving module 142 may be configured to interact with the API of the storage media 150.

In some examples, the DSRM archiving module 142 of the camera 140 may be the same or similar to the archiver module 104 of the dispatcher application 105.

As such, the camera 140 transmits the media stream to the storage media 150 for archiving.

In FIG. 2A, the dispatcher application 105 is not solicited, as the dispatcher application 105 does not have to dispatch a media stream to a user computer 170 for viewing.

Figure 2B:
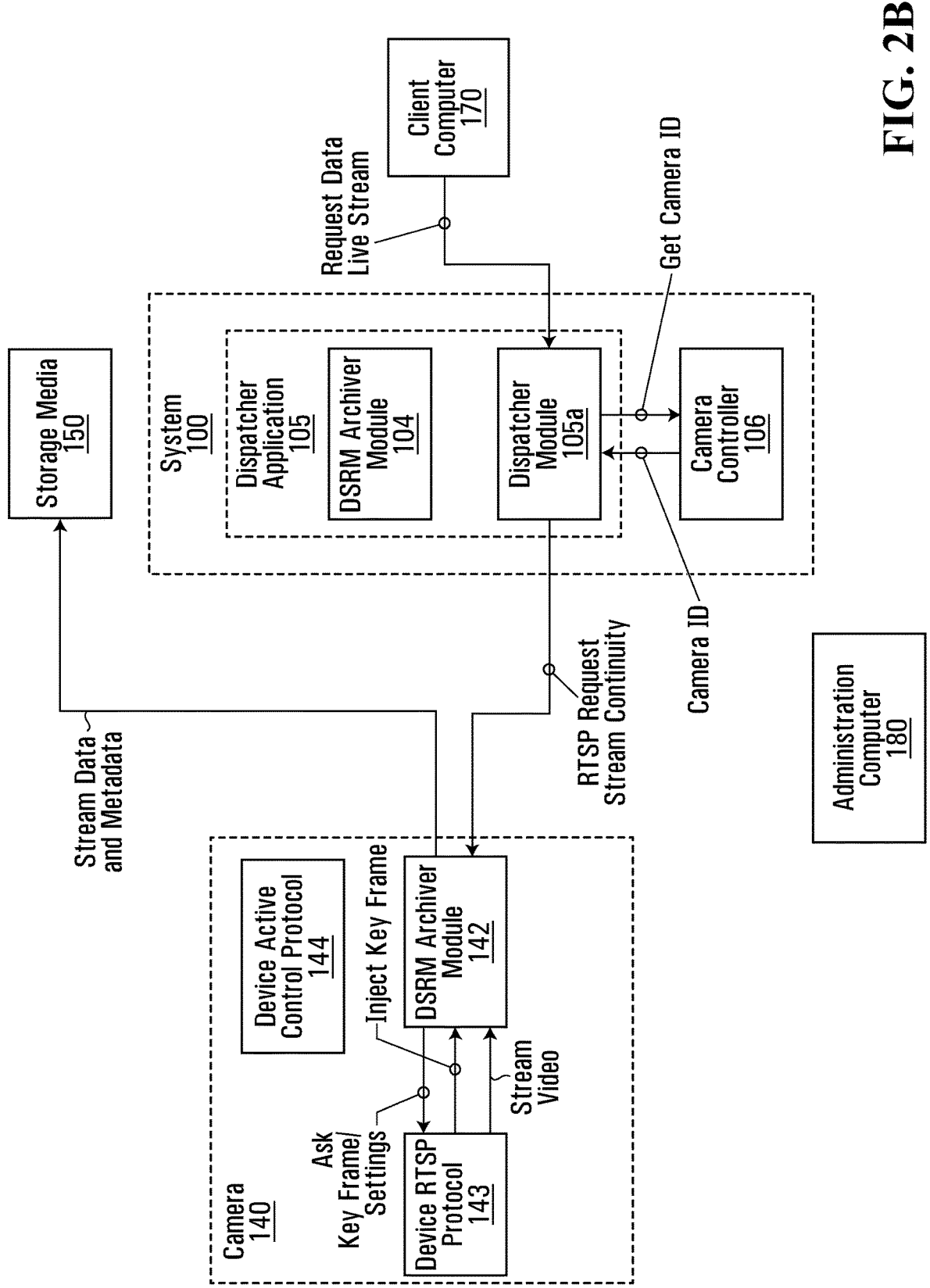
FIG. 2B is a block diagram of a second mode of an exemplary archiving and dispatching system when the system has received a real-time access request.

In FIG. 2B, a user is requesting to view a real-time access from one or more cameras of a surveillance system. The request is transmitted from the user computer 170 to the archiving and dispatching system 100. The real-time access request is received by the dispatcher module 105*a*.

The dispatcher module 105*a* may then generate a request for the identification of camera identification associated with the real-time access request. The camera identification request is transmitted by the dispatcher module 105*a* to the camera controller 106. The controller module 106, receiving the camera identification request, retrieves from memory the camera identification information associated with the camera identification request, and transmits the camera information to the dispatcher module 105*a*. The dispatcher module 105*a* then causes the generation of the destination message for one or more given cameras with, e.g., the address of the one or more cameras. The destination message, when received and processed by the camera 140, causes the camera 140 to send the media stream to the dispatcher module 105*a* instead of to the storage media 150.

As shown in FIG. 2B, when the destination message is sent to the DSRM archiver module 142, the destination message may include change of camera settings (e.g. to generate a new key frame for live streaming as explained herein). As such, the DSRM archiving module 142 requests a key frame from the device RTSP protocol 143. The RTSP protocol 143 then causes the injection of the key frame into the media stream that is transmitted from DSRM archiver module 142 to the dispatcher module 142, injected upon the change of the streaming destination.

Figure 2C:
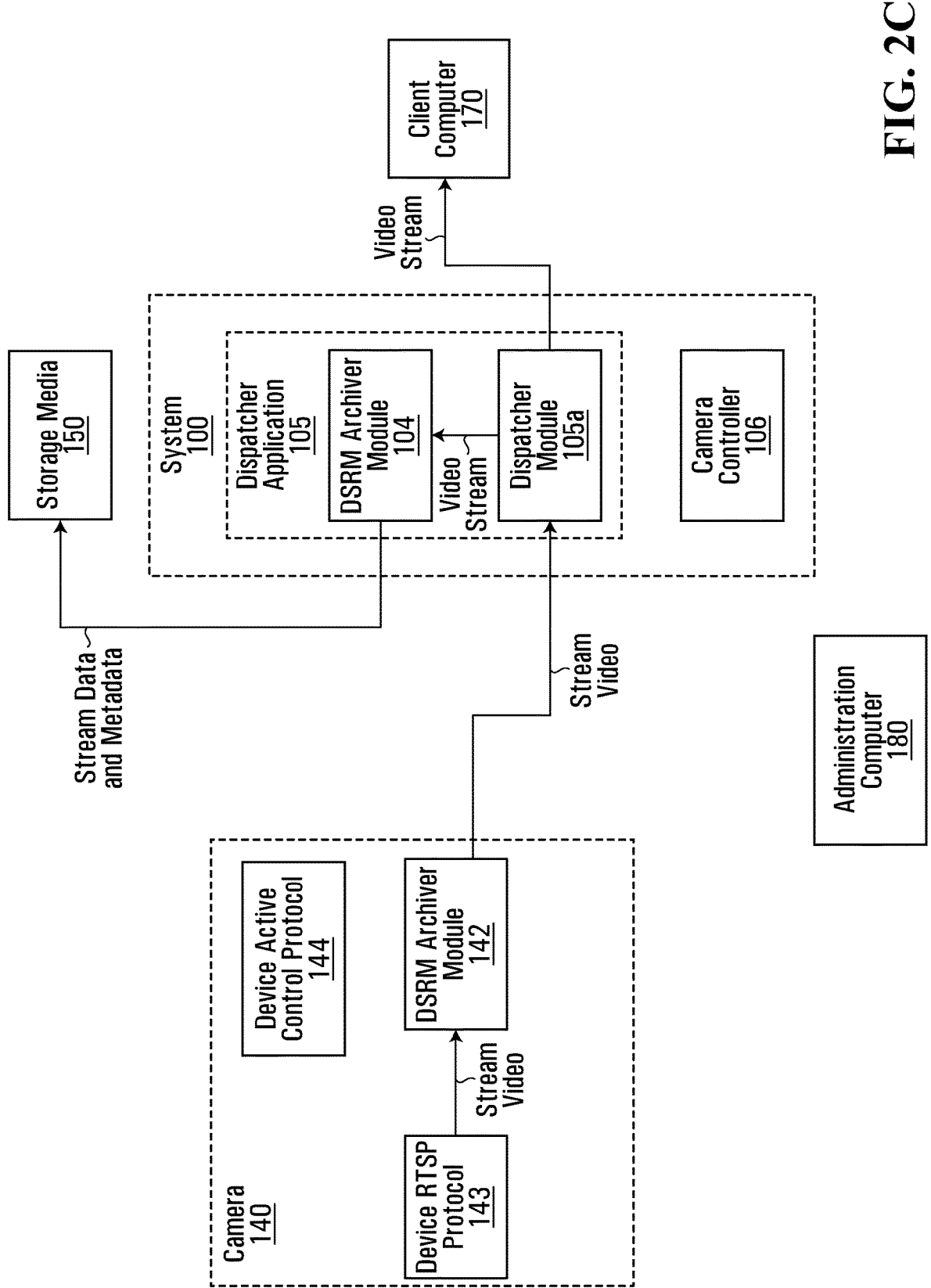
FIG. 2C is a block diagram of a third mode of an exemplary archiving and dispatching system when the system is transmitting video to a user computer after receiving a real-time access request.

With reference to FIG. 2C, after processing the destination message, the camera transmits the media stream to the dispatcher module 105*a*, instead of to the storage media 150.

The dispatcher module 105*a*, receiving the media stream from the camera 140, causes the transmission of the received media stream to the user computer 170. The user can then view the real-time access on the user computer 170 received from the dispatcher module 105*a* of the archiving and surveillance system 100. The receipt of the media stream from the dispatcher module 105*a* is a seamless and continuous transmission of the video data of the media stream that was being archived by the archiver module 104 as further described herein.

The dispatcher module 105*a* also further causes the processor to transmit the received media stream to the archiver module 104 for storage in the storage media 150 of the video data of the media stream. As such, the archiving process continues uninterrupted, the storage media 150 now receiving the media stream from the archiver module 104 instead of directly from the camera 140.

Figure 2D:
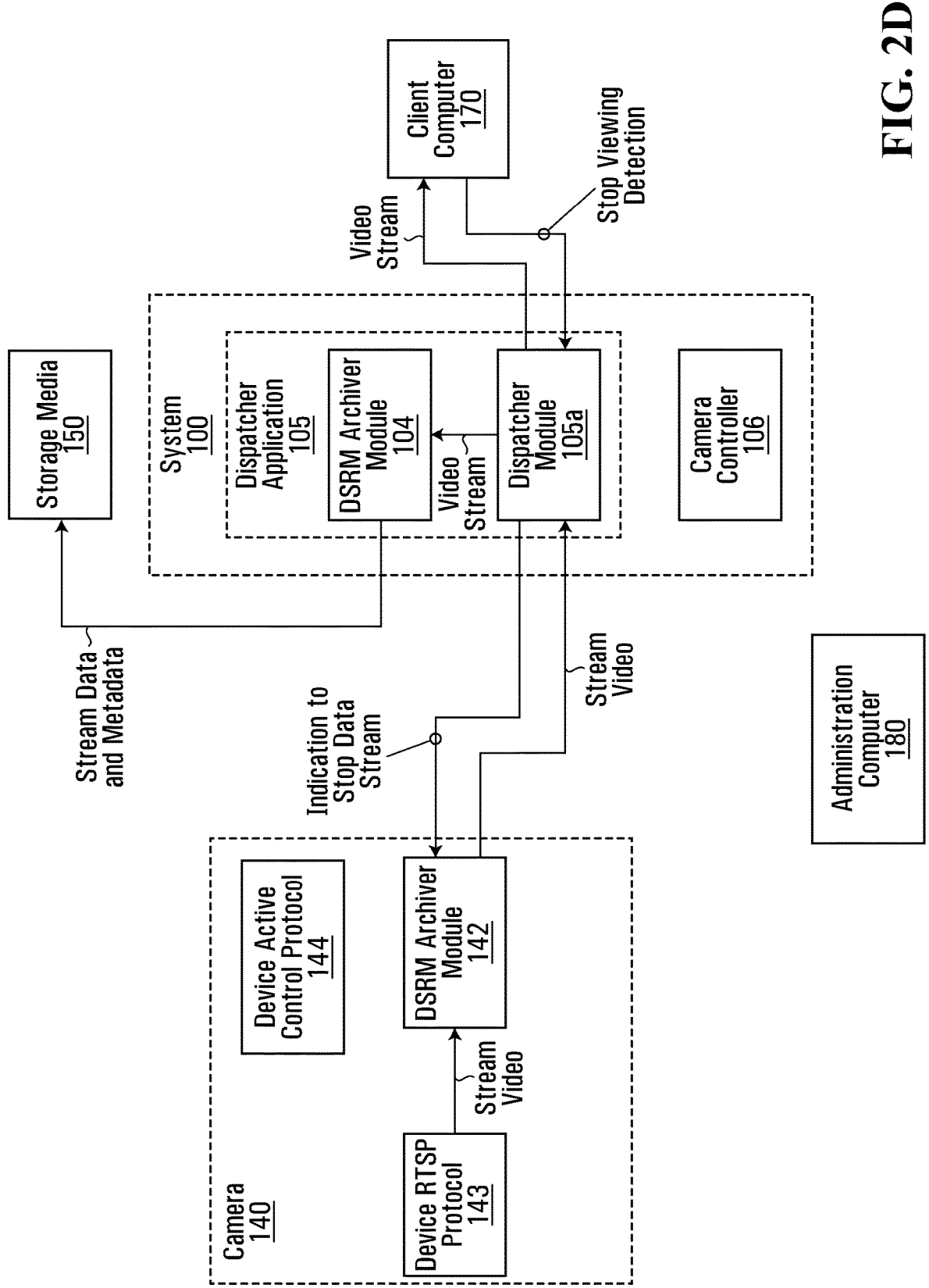
FIG. 2D is a block diagram of a fourth mode of an exemplary archiving and dispatching system when the user stops the real-time access.

As shown in FIG. 2D, when the user stops the real-time access viewing, and there is no longer a need to send the media stream to the user computer 170, the system 100 may receive data received by the system 100 that the user is no longer viewing the real-time access.

The data or detection relating to the stopping of viewing is received and/or detected by the dispatcher module 105*a*.

The dispatcher module 105*a* may process the received data relating to the stopping of the viewing, may retrieve from memory the addresses of the one or more cameras 140 whose media streams are being transmitted to the user computer 170 (or request such information from the controller module 106), and generate a new destination message for each of the one or more cameras 140. In some embodiments, the destination message may be data sent to the camera 140 that the dispatcher module 105*a* is no longer accepting the media stream, causing the camera 140 to revert to the original destination, that of the storage media 150. The destination message, when received and processed by the camera 140, causes the camera to redirect the transmission of the media stream from the dispatcher module 105*a* to the storage media 150.

The destination message is transmitted to the one or more cameras respectively 140, e.g., using the one or more respective addresses of the one or more cameras 140.

Figure 2E:
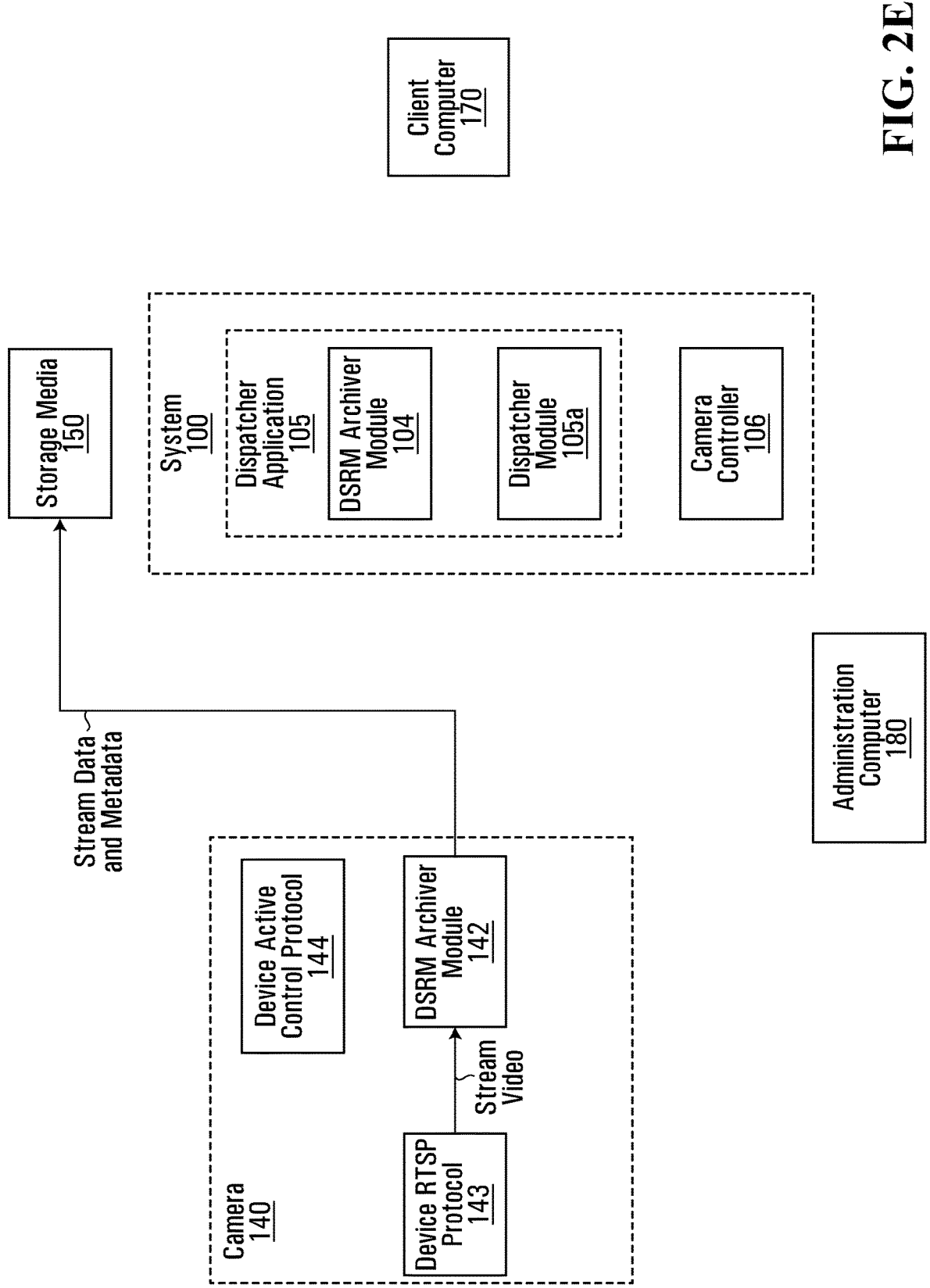
FIG. 2E is a block diagram illustrating a return to a first mode of an exemplary archiving and dispatching system when a user does not request a real-time access from the system.

As shown in FIG. 2E, upon receipt and processing of the new destination message, the camera 140 redirects the transmission of the media stream from the dispatcher module 105*a* to the storage media 150. As such, the dispatcher application 105 is no longer solicited, no longer actively receiving image stream(s) from the camera(s) 140, saving on resources necessary to run the dispatcher application 105. Moreover, the media stream is no longer sent to the user computer 170, and the archiving of the media stream(s) from the one or more cameras 140 continues uninterrupted.

In some embodiments, the controller module 106 may be separate (e.g. stored on a separate computer) from the dispatcher application 105.

It will be understood that, in some examples, the functionality of the controller module 106 may be included in the dispatcher application 105.

Figure 3:
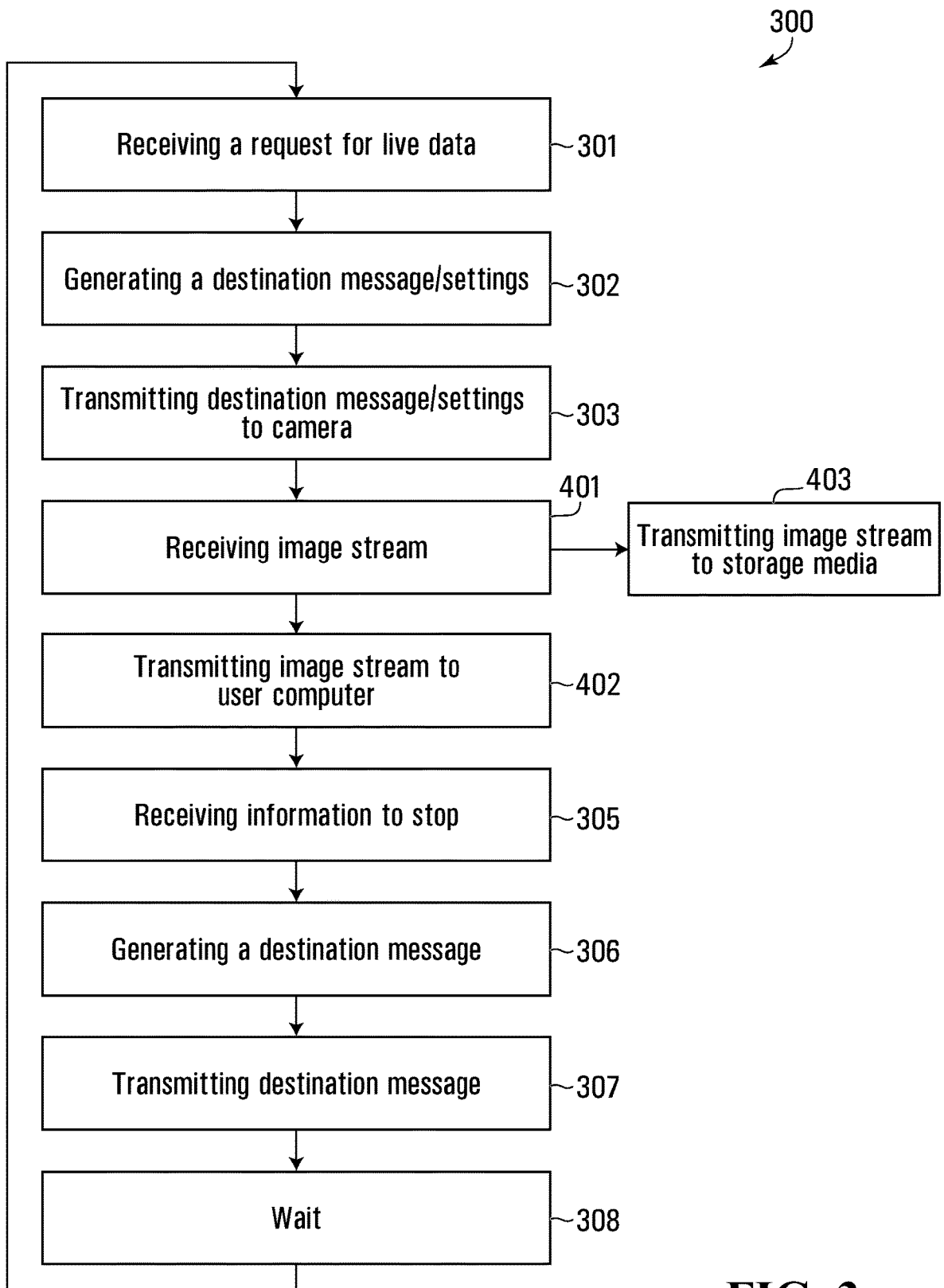
FIG. 3 is a flowchart diagram of an exemplary method performed by an exemplary controller for archiving a media stream and transmitting a media stream to a user computer following a request from the user.
Figure 4:
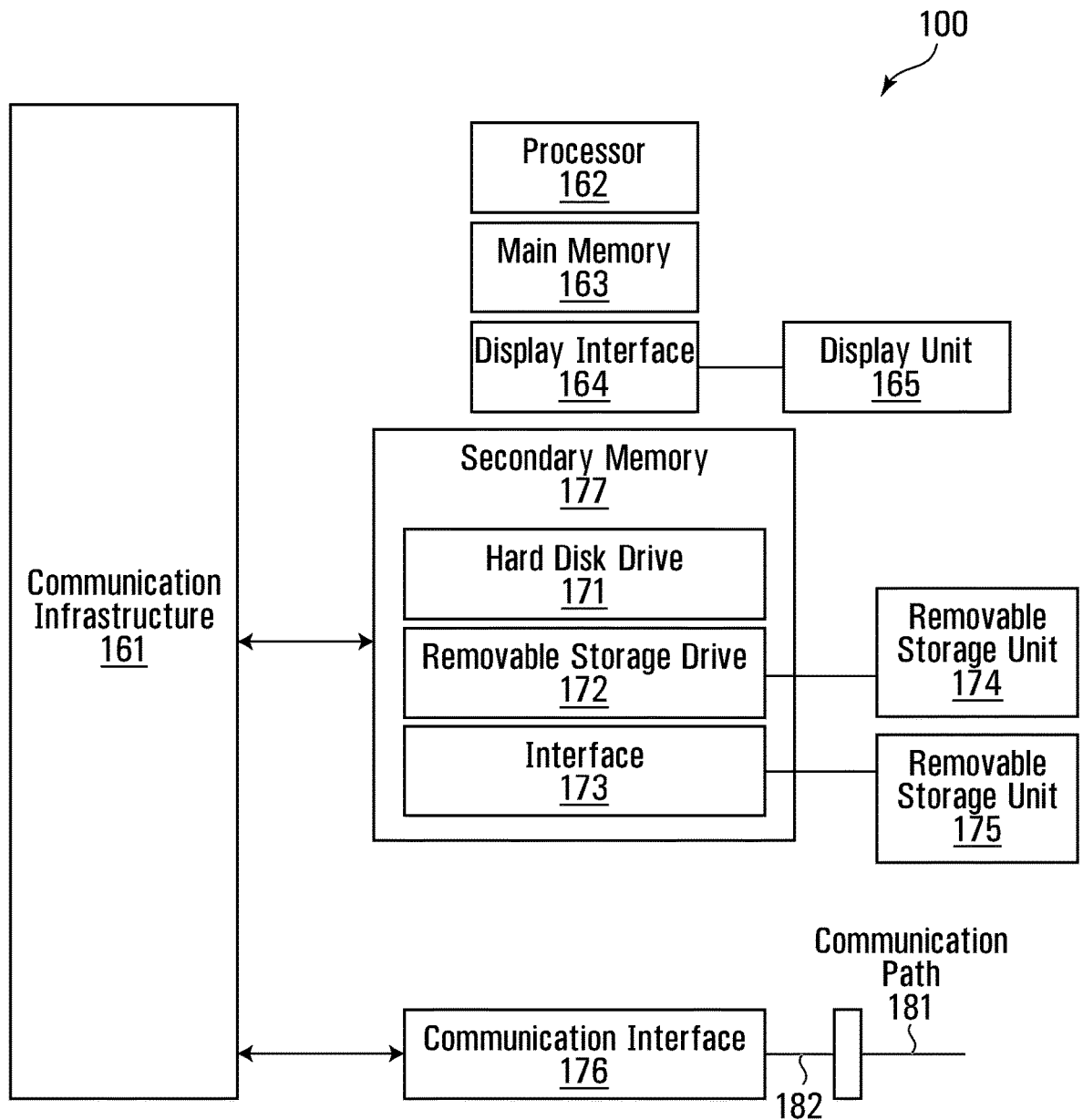
FIG. 4 is a block diagram of various features of an exemplary computer system for use with aspects of the present disclosure.

Exemplary Method of Archiving Media Streams and Dispatching Same for Viewing Performed by a Controller Module:

Reference is now made to FIG. 3, illustrating an exemplary method 300 of archiving one or more media streams received from one or more cameras, carried out by an exemplary processor when executing program code of an exemplary dispatching and archiving system, and of dispatching one or more of the one or more media streams to a user computer for viewing of the one or more media streams. For illustrative purposes, reference is made to the archiving and dispatching system 100. However, it will be understood that any archiving or dispatching system in accordance with the present teachings may be used.

Without any user actively viewing a live media stream, the system 100 is configured such that the one or more media streams received from the cameras 140 are sent to the storage media 150 as explained herein. However, the system 100 may periodically receive real-time access requests from users to view a real-time access of a media stream.

For instance, the camera controller 106 may generate and send, following a request to record stream sent by an administration computer 180, a destination message to cause a camera 140 to transmit a media stream to storage media 150 for archiving. The destination message may include the address of the camera 140, the destination (address, e.g. IP address) of the remote storage database, etc. An exemplary destination message for a stream request may be: Set-StreamTargetStorageMedia(StreamSourceId, StorageMediaType, StorageMediaLocation, StorageCredentials)

The RTSP protocol 143 of the camera 140 may receive the destination message for a stream request, and cause the media stream generated by the camera 140 to be transmitted to the DSRM archiver module 142. The DSRM archiver module 142 may transmit the media stream to storage media 150.

The system 100 receives a request for a real-time access at step 301. An exemplary real-time access request may include data relating to, for instance:
- a live-feed request value;
- the IP address of the requesting computer;
- an identifier of the user;
- the identifier of the surveillance system to which the user and/or the requesting computer belongs to;
- a timestamp;
- the identity of the camera(s) or the streams subject to the request.

The real-time access request may be transmitted the dispatcher module 105a.

The dispatcher module 105a may analyze the data and/or metadata associated with the real-time access request to identify the user and user computer associated thereto. The dispatcher module 105a may also identify if the user has certain permissions to view a media stream. The dispatcher module 105a may then identify the surveillance system associated with the user computer and/or user. This surveillance system identification information may be contained in the real-time access request, or may be retrieved by the dispatcher module 105a from memory using other information transmitted as part of the real-time access request (e.g. user identification; user computer identification; by associating the user computer and/or user with a given surveillance system). In some embodiments, the dispatcher module 105a may also generate a request, for transmission to the controller module 106, for causing the controller module 106 to retrieve from memory such information.

The dispatcher module 105a may then generate a request, transmitted to the controller module 106, to retrieve the identification information of the one or more cameras that are associated with the surveillance system to which a destination message will be sent. In some embodiments, the controller module 106 may retrieve from memory the address information of the one or more cameras 140 associated with the given surveillance system.

In some embodiments, the dispatcher module 105a may not need to request the identification information of the cameras because the real-time access request may include information as to the addresses of the cameras 140 in association with which the real-time access request may be made. For instance, the real-time access request may be associated with only a select few cameras of the cameras 140 of the surveillance system. The identification information and/or addresses of the selected cameras may be present in the real-time access request. In some embodiments, only the identification information of the cameras 140 may be present in the real-time access request.

Once the dispatcher module 105a has obtained the address information of the one or more cameras 140 associated with the real-time access request, the dispatcher module 105a generates, for each of the cameras 140, a destination message or request for causing the camera 140, that is currently transmitting the media stream to the storage media 150, to transmit the media stream instead to the dispatcher module 105a at step 502. The destination message may include the address of the dispatcher API 102. An exemplary destination message may be:
Request:
DESCRIBE rtsp://<cameraRTSPserviceaddress>/live/1 RTSP/1.0
CSeq: 2
Response:
RTSP/1.0 200 OK
CSeq: 2
Content-Base: rtsp://<cameraRTSPserviceaddress>/live/1
Content-Type: application/sdp
Content-Length: 460
m=video 0 RTP/AVP 96
a=control:streamid=0
a=range:npt=0-7.741000
a=length:npt=7.741000
a=rtpmap:96 MP4V-ES/5544
a=mimetype:string;"video/MP4V-ES"
a=AvgBitRate:integer;304018
a=StreamName:string;"hinted video track"
m=audio 0 RTP/AVP 97
a=control:streamid=1
a=range:npt=0-7.712000
a=length:npt=7.712000
a=rtpmap:97 mpeg4-generic/32000/2
a=mimetype:string;"audio/mpeg4-generic"
a=AvgBitRate:integer;65790
a=StreamName:string;"hinted audio track"
Request:
SETUP rtsp://<cameraRTSPserviceaddress>/live/1/streamid=0 RTSP/1.0
CSeq: 3
Transport: RTP/AVP;unicast;client_port=8000-8001
Response:
RTSP/1.0 200 OK
CSeq: 3
Transport: RTP/AVP;unicast;client_port=8000-8001; server_port=9000-9001;ssrc=1234ABCD
Session: 12345678
Request:
PLAY rtsp://<cameraRTSPserviceaddress>/live/1/streamid=0
CSeq: 4
Range: npt=5-20
Session: 12345678
Response:
RTSP/1.0 200 OK
CSeq: 4
Session: 12345678
RTP-Info: url=ADD URL In some embodiments, the dispatcher module 105a may generate, for a given camera 140, along with the destination message, one or more instructions to modify one or more camera settings of the camera 140. For instance, the camera 140 may be generating a compressed media stream in accordance with a given codec (e.g. MPEG; MPEG4). Key frames are generated periodically as part of the compressed media stream, used for decoding the media stream. In order for a user to decode and view the media stream, the receiving user computer may require receiving the next key frame in the media stream in order to generate the video feed. This may cause a certain delay in generating the video, as the user computer may have to wait until the computer receives the next key frame in order to decode and generate the video from the received compressed media stream. The delay may be undesirable, as the user may not be able to view the video immediately after the real-time access request is sent (e.g. having to wait several seconds before receiving the next key frame). In these examples, dispatcher module 105a may generate an instruction for the camera 140 to generate a new key frame upon receipt of the instructions, the new key frame transmitted with the media stream when the media stream is redirected to the dispatcher module 105a upon receipt and processing of the destination message. As such, the user computer 170 receives the new key frame with the compressed media stream, providing the user computer 170 with the key frame such that the user computer 170 may decode the media stream and seamlessly generate the video feed for viewing by the user.

In some examples, the RTSP SET_PARAMETER may be used to change session parameters, such as injecting a key frame, for instance:
RequestSET_PARAMETER rtsp://myserver/axis-media/media.amp RTSP/1.0
CSeq: 7
Session: 12345678
Content-Type: text/parameters
Content-Length: 19
Renew-Stream: yesCopy code exampleResponseRTSP/1.0 200 OK
CSeq: 7
Session: 12345678
Date: Thurs, 17 Jul. 2008 14:01:28 GMT In some embodiments, the camera 140 (e.g. RTSP protocol 143 of the camera 140) may be configured to inject a new key frame whenever the destination of the media stream changes.

A generated destination message is then transmitted by the dispatcher module 105a to each of the one or more cameras 140 at step 303. The transmission is performed based on the address information for each of the one or more cameras 140 obtained by the controller module 106. The receipt by the camera 140 of the destination message causes the camera 140 to redirect the generated media stream from the storage media 150 to the dispatcher module 105a.

In some examples, the dispatcher module 105a may store in memory information relating to the real-time access request, including the address of identification of the user computer 170 that generated the real-time access request. The stored information relating to the real-time access request may be retrieved by the dispatcher module 105a from memory. In other examples, where a single user computer address is associated with a given surveillance system, the dispatcher module 105a may retrieve from memory address information relating to the user computer for transmitting the media stream.

The media stream received by the user computer 170 is a seamless continuation of the media stream that is being archived. The archiving process is also carried out uninterrupted, the storage media 150 continuing to receive the media stream generated by the camera, however now transmitted by the archiver module 104 instead of by the camera 140 directly.

At step 401, the dispatcher module 105a receives from the camera 140 (e.g. DSRM archiver module 142) the media stream.

Upon receipt of the media stream, the dispatcher module 105a may also analyze the metadata associated with media stream to obtain information on the media stream for further transmission (e.g. the identification of the source camera; the address of the source camera; the identification of the surveillance system associated with the source camera; the codec type; timestamp; GPS coordinates of source camera; etc.)

The dispatcher module 105a transmits the received media stream to the user computer 170 for real-time access at step 402, in accordance with the address information (e.g. IP address) of the user computer 170. The dispatcher module 105a may retrieve from memory destination or address information of the user computer 170, or may receive the information from the controller module 106.

The dispatcher module 105a transmits the received media stream to the archiver module 104, the archiver module 104 transmitting the media stream to the storage media 150 for archiving the video data of the media stream at step 403.

The system 100 (e.g. the dispatcher module 105a) may receive from a user computer 170 information indicative of or may detect that the user computer no longer requesting the real-time access. The information indicative of the end of the real-time access viewing may be transmitted to the dispatcher module 105a. As such, the dispatcher module 105a receives the information indicative of the end of the real-time access or detects the end of the real-time access at step 305. The information indicative of the end of the real-time access received by the controller module 106 may include:
  a stop live-feed value;
  the stream session identification (ID);
  an identifier of the user;
  the identifier of the surveillance system to which the user and/or the requesting computer belongs to;
  a timestamp;
  the identity of the camera(s) transmitting media stream to user computer.

The dispatcher module 105a may then process the received data and may then determine that the real-time access is no longer needed.

Following the determination that the real-time access is no longer needed, the dispatcher module 105a may generate a destination message for each of the one or more cameras 140 that are currently transmitting the media stream to the dispatcher module 105a for viewing on the user computer 170 that generated the data indicative of the end of the real-time access at step 306. In some embodiments, the destination message generated by the dispatcher module 105a may be a request to stop transmitting the media stream to the dispatcher module 105a.

In some examples, the address information for each of the cameras 140 may be present as part of the data indicative of the end of the real-time access. In other examples, the dispatcher module 105a may request from the controller the camera identification information on the one or more cameras 140 whose media steam is being transmitted to the user computer 170, the controller module 106 retrieving from memory address data on the one or more cameras 140 whose media stream is being transmitted to the user computer 170 that generated the data indicative of the end of the real-time access, transmitting same to the dispatcher module 105a.

The destination message generated by the controller module 106 causes the camera 140, when received and processed by the camera 140, to redirect transmission of the media stream from the dispatcher module 105a to the storage media 150. By doing so, the archiving process continues uninterrupted (the storage media 150 then receiving the media stream directly from the camera 140, instead of from the archiver module 104). In other embodiments, when the destination message is a request to stop sending the media stream to the dispatcher module 105a, the camera 140 may simply revert to the original media stream transmission configuration, that of transmitting the media stream to the storage media 150.

An exemplary destination message may be: SetStreamTargetStorageMedia(StreamSourceId, StorageMediaType, StorageMediaLocation, StorageCredentials)

The destination message is then transmitted by the dispatcher module 105*a* to each of the one of more cameras 140 that are currently transmitting the media stream to the dispatcher module 105*a* for viewing at the user computer 170 that transmitted the data indicative of the end of the real-time access at step 307.

The destination message is transmitted to each of the one or more cameras 140 in accordance with the address information for each of the one or more cameras 140.

As the destination message is received and processed by the camera 140, the camera redirects the media stream from the dispatcher module 105*a* to the storage media 150.

The dispatcher application 105 is then no longer solicited as no real-time access is requested. As such, the system does not have to expend resources to keep the dispatcher application 105 active when no real-time access is requested.

Moreover, the storage media 150 receives an uninterrupted media stream from camera 140, the source of the media stream received by the storage media 150 alternating between the camera 140 and dispatcher module 105*a* depending on the presence or absence of real-time access by a user computer 170.

In some embodiments, the controller module 106 may instead generate and transmit to the camera 140 instructions to send the same media stream to the storage media 150 and to a network-attached storage (NAS) server. In these examples, the destination message generated by the controller module 106 provides the address of both the storage media 106 and the network-attached storage server. The destination message may include a set of protocols for causing the camera to send the media stream to both destinations.

The controller module 106 then waits at step 308 until receipt of a further request for real-time access, returning to step 301.

Exemplary Computer Infrastructure:

Aspects of the present disclosure may be implemented using hardware, software, executed by a processor, or a combination thereof and may be implemented in one or more computer systems. In an aspect of the present disclosure, various features may be directed toward one or more computer systems capable of carrying out the functionality described therein. An example of a computer system may be the one illustrated in FIG. 6.

The system 100 includes one or more processors, such as processor 162. The processor 162 is coupled to a communication infrastructure 161 (e.g. a communications bus, cross-over bar, network, etc.). However, it will be apparent to a person of ordinary skill in the art how to implement aspects hereof using other computer systems and/or architectures.

The system 100 may include a display interface 164 that forwards graphics, text, and other data from the communication infrastructure 161 (or from a frame buffer, not shown) for display on a display unit 165. The archiving and dispatching system 100 may include a main memory 163 (e.g. random access memory—RAM), and may also include secondary memory 177. The secondary memory 177 may include, for example, a hard disk drive 171 and/or a removable storage drive 172, e.g., optical disk drive. The removable storage drive 172 may read from and/or write to a removable storage unit 174. The removable storage unit 174 may include a computer readable storage medium having stored therein computer software and/or data.

Alternative aspects of the present disclosure may include secondary memory 177 and may include other similar devices for allowing computer programs or other instructions to be loaded into the system 100. These devices may include, for instance, a removable storage unit 175 and an interface 173. Examples of such may include, for instance, a removable memory chip (such as an erasable programmable read only memory (EPROM), or programmable read only memory (PROM)) and its associated socket, and other removable storage units 175 and its interface 173, which allow software and data to be transferred from the removable storage unit 175 to the archiving and dispatching system 100.

The archiving and dispatching system 100 may also include a communications interface 176. The communications interface 176 may allow software and data to be transferred among the system 100 and external devices. Examples of communications interface 176 may include, but are not limited to, a modem, a network interface (such as an Ethernet card), a communications port, a Personal Computer Memory Card International Association (PCMCIA) slot and card, etc. Software and data transferred via communications interface 176 may be in the form of signals 182, which may be electronic, electromagnetic, optical and other signals capable of being received by communications interface 176. These signals 182 may be provided to communications interface 176 via a communications path (e.g. channel) 181. This communications path 181 may carry signals and may be implemented using wire or cable, fibre optics, a telephone line, a cellular link, a radio frequency (RF) link and/or other communications channels. As used herein, the terms "computer readable medium", "computer program medium", and computer usable medium" refer generally to media such as a removable storage drive 172, and/or a hard disk installed in the hard disk drive 171.

Computer programs and/or data may be stored in main memory 163 and/or secondary memory 177. Computer programs and/or data may also be received via communications interface 176. Such computer programs, when executed, may enable the system 100 to perform the features in accordance with aspects of the present disclosure as discussed herein. In particular, the computer programs, when executed, may enable the processor 162 to perform the features in accordance with aspects of the present disclosure. Accordingly, such computer programs may represent controllers of the system 100.

Where aspects of the present disclosure may be implemented using software, the software may be stored in a computer program produced and loaded into the system 100 using removable storage drive 172, hard disk drive 171, or interface 173. The control logic (software), when executed by processor 162, may cause the processor 162 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons of ordinary skill in the art. In yet another variation of the present disclosure, aspects of the present disclosure may be implemented using a combination of both hardware and software.

Exemplary Embodiments

The following non-limitative examples illustrate the archiving and dispatching system of the present disclosure.

Example 1

A homeowner installed a few cameras around his house. The cameras generate a video stream that is sent to an archiving service. The archiving service also has a dispatching service to provide real-time access to the image stream to users.

A controller module is implemented on a server with an archiving and dispatching system, the system for reducing the resource consumption of the archiving and dispatching.

As the homeowner has not made any requests to have real-time access via the web of the video stream, the controller module may send a destination message to each of the cameras of the home surveillance system to have the generated video stream sent to the storage media for archiving.

The homeowner receives a notification from an alarm company that one of the sensors of the alarm system has detected movement in the house. The homeowner opens an application program running on his smartphone to check the video feed generated by the cameras of the home surveillance system. The application program generates a request for real-time access.

The dispatcher module of the dispatching system receives the request for real-time access and generates a destination message, directed to the address of each of the cameras of the home surveillance system. The destination message causes the camera to redirect the video stream to the dispatcher module of the archiving and dispatching service, and not to storage media.

The destination message is transmitted by the dispatching module to the address of each of the cameras (e.g. IP address) of the home surveillance system. The cameras then send the video stream to the dispatcher module of the archiving and dispatching service instead of to the storage media.

In some examples, (e.g. upon request from the dispatcher module) the controller module may also transmit data to the dispatcher module regarding the identification and address of the smartphone of the homeowner, such that the dispatcher module possesses the information necessary to transmit the video stream to the computer that made the request for real-time access.

The receipt of the video stream by the dispatcher module causes the sending of the video stream to both the smartphone of the homeowner and to the archiver module of the dispatcher module, the archiver module transmitting the media stream to the storage media to continue seamlessly to archive the video data of the image stream in the storage media.

Example 2

The archiving and dispatching service may receive media streams from cameras of a company security system.

As described herein, as no real-time access requests have been made, the cameras are currently transmitting the media streams to storage media for archiving.

A security officer of a given company makes a request from a workstation to obtain the video feed from camera 1 directed to the interior of a warehouse.

The real-time access request is received by the dispatcher module of the archiving and dispatching service. The real-time access request includes the identification of the camera of which the security officer would like to obtain a live feed. The dispatcher module generates a query directed to memory (or to the controller module that retrieve the information from memory) to retrieve the address information (e.g. IP address) of the camera associated with the camera identification information included in the real-time access request.

Having the address information of the camera, the dispatcher module generates a destination message, directed to the retrieved address of the camera. The destination causes the camera to redirect the video stream to the dispatcher module of the archiving and dispatching service, and not to storage media.

The dispatcher module transmits the destination message to the address of the camera corresponding to the camera identification information included in the real-time access request.

The camera receives the destination message, and redirects the image stream from the storage media to the dispatcher module.

The dispatcher module, having received the image stream, transmits the image stream to the archiver module of the dispatcher application, where the archiver module transmits the media stream to the storage media to continue archiving, and to the workstation, for viewing by the security officer stationed at the workstation.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of managing a media stream received from a camera comprising:
    instructing the camera to send the media stream generated by the camera over a network to storage media at a first network location, the storage media being configured to store video data from the media stream;
    receiving a request for real time access to the media stream from a requesting computing entity at a second network location; and
    based on the receiving of the request, sending a first destination message to the camera comprising instructions to change a destination of the media stream from the storage media at the first network location to a dispatcher at a third network location configured to receive and dispatch stream data, such that the camera continues transmission of the media stream by sending the media stream towards the dispatcher at the third network location.

2. The method as defined in claim 1, further comprising receiving the media stream of the camera at the dispatcher, the dispatcher transmitting the media stream to the storage media at the first network location and transmitting at least some data from the media stream to the requesting computing entity at the second network location, such that the storage media receives the media stream in continuous fashion through transition of the destination of the media stream from the storage media to the dispatcher.

3. The method as defined in claim 1, wherein the first destination message comprises a change of address instruction indicating an address of the third network location corresponding to the dispatcher.

4. The method as defined in claim 1, further comprising:
upon determining that the real-time access is no longer needed, sending a second change of destination message to the camera comprising instructions to change the destination of the media stream from the dispatcher at the third network location to the storage media at the first network location, such that the storage media receives a logically continuous sequence of video data from the media stream through transition of the destination of the media stream from the dispatcher to the storage media.

5. The method as defined in claim 4, wherein the second change of destination message comprises a change of address instruction indicating an address of the first network location corresponding to the storage media.

6. The method as defined in claim 1, further comprising:
upon determining that the real-time access is no longer needed, sending a message to the camera comprising instructions to stop the media streaming to the dispatcher at the third network location, causing the camera to transmit the media stream to the storage media at the first network location such that the storage media receives a logically continuous sequence of video data from the media stream through transition of the destination of the media stream from the dispatcher to the storage media.

7. The method as defined in claim 1, further comprising sending one or more camera setting commands to the camera for causing the camera to change one or more camera settings corresponding to said one or more camera setting commands.

8. The method as defined in claim 7, wherein said one or more camera setting commands includes a command to inject a new key frame.

9. The method as defined in claim 1, further comprising, prior to sending the first destination message, retrieving from a memory camera stream identification information corresponding to the camera associated with the real-time access request.

10. A system for managing a media stream received from a camera comprising:
non-transitory memory to store data and instructions;
a processor in communication with the memory; and
an application program accessible via the memory and the processor that comprises:
a controller module comprising program code that, when executed by the processor, causes the processor to instruct the camera to send the media stream generated by the camera over a network to storage media at a first network location, the storage media being configured to store video data from the media stream; and
a dispatcher comprising program code that, when executed by the processor, causes the processor to:
dispatch a media stream received from the camera to storage media at the first network location and to a computing entity requesting real time access;
receive a request for real time access to the media stream from a requesting computing entity at a second network location; and
based on the receiving of the request, send a first destination message to the camera comprising information to change a destination of the media stream from the storage media at the first network location to the dispatcher of the application program, at a third network location, configured to receive and dispatch stream data, such that the camera continues transmission of the media stream by sending the media stream towards the dispatcher at the third network location.

11. The system as defined in claim 10, wherein the dispatcher further comprises program code that, when executed by the processor, causes the processor to, upon receipt at the dispatcher of the media stream of the camera, transmit the media stream to the storage media at the first network location and transmitting at least some data from the media stream to the requesting computing entity at the second network location, such that the storage media receives the media stream in continuous fashion through transition of the destination of the media stream from the storage media to the dispatcher.

12. The system as defined in claim 10, wherein the first destination message comprises a change of address instruction indicating an address of the third network location corresponding to the dispatcher.

13. The system as defined in claim 10, the dispatcher further comprises program code that, when executed by the processor, cause the processor to, upon determining that the real-time access is no longer needed, send a second destination message to the camera comprising instructions to change the destination of the media stream from the dispatcher at the third network location to the storage media at the first network location, such that the storage media receives a logically continuous sequence of video data from the media stream through transition of the destination of the media stream from the dispatcher to the storage media.

14. The system as defined in claim 13, wherein the second change of destination message comprises a change of address instruction indicating an address of the first network location corresponding to the storage media.

15. The system as defined in claim 10, the dispatcher further comprises program code that, when executed by the processor, cause the processor to, upon determining that the real-time access is no longer needed, send a message to the camera comprising instructions to stop the media streaming to the dispatcher at the third network location, causing the camera to transmit the media stream to the storage media at the first network location such that the storage media receives a logically continuous sequence of video data from the media stream through transition of the destination of the media stream from the dispatcher to the storage media.

16. The system as defined in claim 10, wherein the dispatcher further comprises program code that, when executed by the processor, cause the processor to send one or more camera setting commands to the camera for causing the camera to change one or more camera settings corresponding to said one or more camera setting commands.

17. The system as defined in claim 16, wherein the one or more camera setting commands includes a command for generating a new key frame.

18. The system as defined in claim 10, wherein the dispatcher further comprises program code that, when executed by the processor, prior to sending the first destination message, cause the processor to retrieve from the non-transitory memory camera stream identification information corresponding to the camera associated with the real-time access request.

19. The system as defined in claim 10, wherein the controller further comprises program code that, when executed by the processor, prior to sending the first destination message, cause the processor to retrieve from the non-transitory memory camera stream identification information corresponding to the camera associated with the real-time access request.

20. The system as defined in claim 10, wherein the first destination message is an RTSP request comprising camera stream identification information.

21. A non-transitory computer-readable medium storing instructions executable by a computer device, comprising:
   at least one instruction for causing the computer device to instruct a camera to send a media stream generated by the camera over a network to storage media at a first network location, the storage media being configured to store video data from the media stream;
   at least one instruction for causing the computer device to receive a request for real time access to the media stream from a requesting computing entity at a second network location; and
   at least one instruction for causing the computer device to send, based on the receiving of the request, a first change of destination message to the camera comprising instructions to change a destination of the media stream from the storage media at the first network location to a dispatcher at a third network location configured to receive and dispatch stream data, such that the camera continues transmission of the media stream by sending the media stream towards the dispatcher at the third network location.

* * * * *